July 10, 1934.  D. L. LEA  1,965,943
TRUCK CONSTRUCTION
Filed Nov. 14, 1932
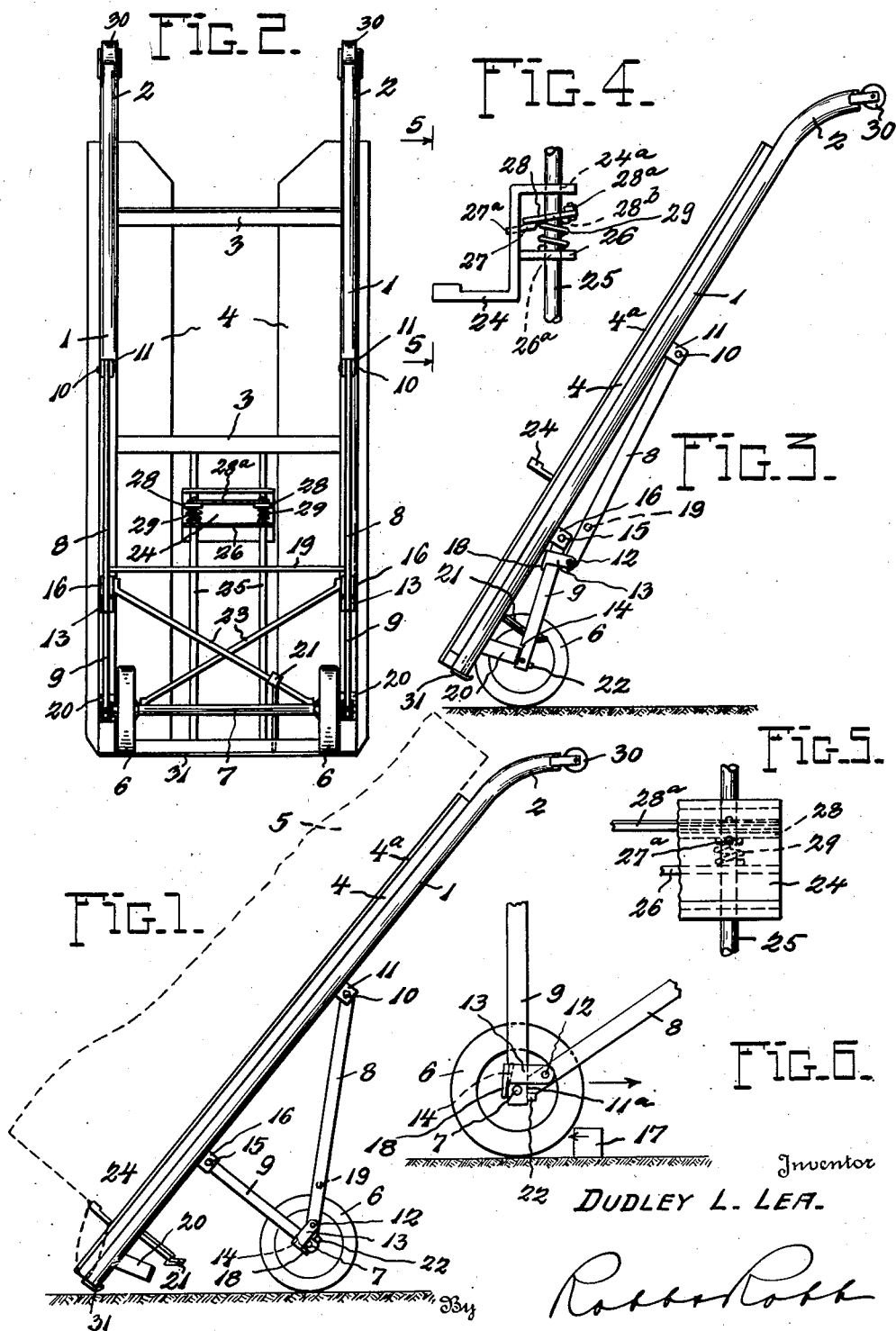
Inventor
DUDLEY L. LEA.

Patented July 10, 1934

1,965,943

UNITED STATES PATENT OFFICE 1,965,943

TRUCK CONSTRUCTION

Dudley L. Lea, Findlay, Ohio

Application November 14, 1932, Serial No. 642,676

3 Claims. (Cl. 280—56)

This invention involves a novel construction of hand trucks of types employed for moving heavy bodies such as trunks and other similar objects. The hand truck of this invention is designed primarily with a view to facilitating the moving of heavy refrigerators such as are commonly used today, and deals with some of the problems of such handling. For instance, in moving a refrigerator into houses and apartment buildings and the like, narrow passageways are encountered, and it is difficult to turn the truck into these passageways and around stair landings if the truck is inclined a considerable extent as usually found desirable to balance the weight of the object handled as it is being rolled to the place where it is to be deposited.

To deal with the problem above presented, the truck of my invention employs a folding or collapsing frame structure which carries the supporting wheels or rollers and which is readily adjustable so that when the truck is being handled and moved where plenty of space is allowed, the load or weight thereon may be inclined considerably, much after the manner of using the ordinary hand trucks in railroad stations. Under these conditions, the wheeled frame is adjusted in a position of maximum projection from the body frame of the truck. However, when the truck reaches a narrow space, such as a hallway, with its load, my invention provides that the collapsing or folding frame on which the supporting wheels are mounted may be pushed toward the body frame to bring the wheels or rollers practically in the lower end of said body frame. This enables the truck or body frame to be elevated to nearly a vertical position, with the supporting wheels remaining operative and permitting the shifting of the center of gravity over the wheels in their newly adjusted position so that the load can be balanced readily even though the truck frame is in almost a vertical position. This adjustment of the truck frame to approximately a vertical position enables the user of the truck to turn the same in a narrow space in which it would be impossible to turn the ordinary hand truck, or the truck of my invention while the supporting wheels are projected their maximum distance from the underside of the frame.

Therefore, my invention will be understood to involve a hand truck such as generally referred to above with very novel provisions for the adjustment of the supporting rollers or wheels of said truck, there being additionally availed of provisions for locking the supporting wheels in their position of maximum projection from the frame, and in the position in which they are collapsed so as to be very close to the lower end of the frame for the purpose previously described.

A special type of rest or support for the object carried by the truck is utilized and adjustably mounted on the truck frame member held in desired position by special locking or latching provisions, to be hereinafter set forth.

Additionally, there are provided for the handles of the truck frame special supporting rollers to be used when the truck is employed after the manner of a horizontal four-wheel vehicle.

In the drawing:

Figure 1 represents a truck embracing the improved features of this invention, showing the truck inclined at an angle at which it is normally handled for convenience, and showing a conventional type of domestic refrigerator mounted on the truck.

Figure 2 is a bottom view of the truck without the refrigerator mounted thereon, showing certain details of the mounting of the securing means to the object carried on the truck.

Figure 3 is a side view of the truck with the wheel supporting frame in folded or collapsed position, the truck being swung vertically for passage around a sharp turn or the like.

Figure 4 is a detail view showing the mounting of one of the securing members.

Figure 5 is a front view of Figure 4, looking on the line 5—5 of Figure 4, in the direction of the arrows.

Figure 6 is a fragmentary view of the lower portion of the wheel mounting, showing certain details of the construction which are operable when the wheels meet with an obstruction during operation of the truck.

Referring more particularly to the drawing, the truck includes a frame which is illustrated as comprising the side bars 1, terminating in the handle portion 2 and held suitably spaced by the transverse bars 3. Mounted upon the truck frame are the platform pieces 4, which may be provided with a felt padding 4a or the like, and which, as illustrated, directly carry an object 5 which is illustrated as being a refrigerator of a standard domestic type, although it will be understood that the invention is not so limited.

The truck is mounted upon a sub-frame including wheels 6 interconnected by the axle 7, the wheels being in turn interconnected with the truck frame by means of the arms 8 and 9, of which the arm 8 is illustrated as being the longer of the two arms. This structure is duplicated on each side of the truck, and accordingly, only one set of the elements need be described in detail.

The arm 8 is pivotally mounted at 10 to brackets 11 suitably secured to the frame members 1, the other end of the arm 8 being substantially square-cut as shown at 11a, to closely engage the arm 9 adjacent the free end of this arm. The arm 8 is pivotally interconnected at 12 to a clip 13 which fits over the arm 9 and interengages with a notch 14 therein.

The arm 9 has mounted therein the axle 7 adjacent the lower end of arm 9, the arm being pivoted at its upper end, as shown at 15, to the bracket 16 secured to the frame. It will be understood that there is a certain amount of play between the clip 13 and arm 9 so that the clip may slide on the arm 9; but in the event the wheels engage an obstruction 17, see Figure 6, the arm 9 will press against the extension 18 of the clip 13 so that the clip will be forced into tighter engagement with the notch 14, and the wheel supporting structure will be secured against any tendency to collapse or fold.

When it is desired to bring the truck around a sharp bend, or to bring the truck past any location where it would be obstructed by restricted space, the supporting structure for the wheels may be folded or collapsed into the position shown in Figure 3. To effect this change in position of the wheel supporting elements, force is exerted against the rod 19 interconnecting the arms 8, which pivots the arms about the points 10, moving the clip 13 along the arm 9, and correspondingly turning arm 9 on its pivot 15 until it engages the stop 20 carried by the truck frame. The arms may be held in their folded position by means of a hook, or equivalent retaining member 21, and which is secured to the truck frame.

In this collapsed position of the wheels, it will be seen that by swinging the truck into a substantially vertical position, while keeping the load balanced, it may be turned through a very acute angle, and a substantially restricted space will be passable. When it is desired to return the wheels 6 to their normal position, a stop 22 prevents disengagement of the clip 13 from the arm 9. It will be understood that the clip 13 moves along arm 9 as the support is folded and expanded, the clip 13 coming to rest on stop 22, which stop supports the downward position of the arm 8, relieving any strain on pin 12 of clip 13. When in the collapsed position, it will be observed that the hook 21 above referred to, engages one of the reinforcing bars 23 which extend between the respective arms as shown in Fig. 2, and rigidly brace the wheel structure.

In order to support a refrigerator or other object on the truck, a hook or engaging member 24 of an S-like configuration is provided. The said engaging member is provided with apertures 24a through which parallel guides 25 are passed. The engaging member 24 comprises further an extension 26 which is also provided with apertures 26a which supply an additional bearing portion for the guides 25. Between the upper portion of the engaging member, see Figure 4, and the extension 26, there are locking plates 28 which comprise extensions 27, the ends 27a of which are yieldably arranged within holes of the engaging member. The plates 28 are provided with apertures 28b through which the guide members 25 pass. The engaging member and extension 26, as well as the locking plates 28, are slidable on the guide members 25, as will be obvious from Figure 4. Springs 29 between locking plates 28 and the extension 26 are adapted to hold the locking plates in an inclined position with respect to the guide members 25 so that the side walls of the apertures 28b of such locking plates will frictionally engage or edge into the said guide members 25 so that any motion of the engaging member 24 is impossible. The locking plates 28 are interconnected by means of a bar 28a as clearly seen in Figures 2 and 4. To adjust the engaging member into different positions with respect to the truck structure 1, it is only necessary to press the bar 28a toward the extension 26 against the force of the springs 29. The locking plates 28 are thereby brought into a right-angle position with respect to the guides 25. The frictional engagement between the locking plates and guides 25 will be thereby released and the engaging member 24 may be readily adjusted to various positions. After release of the pressure which was exerted against the bar 28a to compress springs 29, the locking plates 28 will move back to their original position as shown in Figure 4 and will again edge into the guide members 25 and perform the aforementioned locking action, thereby securing the engaging member in desired adjusted position.

The hook members 24 are releasably adjustable as mentioned above to engage the object, say a refrigerator, in the manner indicated in Figure 1, so as to engage the refrigerator beneath its bottom and to support it against any damage during handling, thereby obviating all possibility of damage to the construction of the refrigerator or marring of the finish thereof.

It will be seen that the wheel construction herein illustrated not only enables the device to be swung around a very sharp angle or turn, but it also enables the truck to be carried up and down steps if necessary much more readily than would be the case were the wheel construction wholly rigidly mounted. The wheel construction also is such that the truck can be readily handled by an attendant at all times.

To further facilitate handling of the truck along inclined planes and the like, rollers 30 may be mounted on the end of the handle portion 2 of the truck frame, as will be clear from Figure 1. To utilize these rollers, the truck is tilted until the rollers 30 engage the floor surface, which may be a ramp or any inclined plane, and the truck pushed up the ramp in the manner of a four-wheeled truck.

The lower end of the truck frame is provided with a curved plate 31 which is adapted to protect the floor when the truck is excessively tilted so that the frame abuts against the floor.

Having thus described my invention, what I claim as new and desire to secure by Letters Patent of the United States, is—

1. A truck construction of the character described, comprising, in combination, a body frame, a wheeled mounting for the frame including interconnected arms pivotally mounted on the frame, a clip pivotally secured to one of the arms and engaging an adjacent arm for interconnecting the said arms while allowing relative movement therebetween, the latter of the said arms being adapted to releasably interlock with the said clip for holding the arms in expanded position while enabling the said arms to be readily folded or collapsed when desired.

2. A truck construction of the character described, comprising, in combination, a frame, a wheeled mounting for the frame including interconnected arms pivotally mounted on the frame, a clip pivotally secured to one of the arms and engaging an adjacent arm for interconnecting the said arms while allowing relative movement therebetween, the latter of the said arms being provided with a notch adapted to releasably interlock with the said clip for holding the arms in expanded position while enabling the said arms to be readily folded or collapsed when desired, the said clip being provided with a downwardly extending projection engaging the said arm to prevent disengagement of the clip from the said notch under impact of an obstruction against the wheels of the support during travel of the truck.

3. A truck construction of the character described, comprising, in combination, a body frame, a wheel mounting for the frame including inter-connected arms pivotally mounted on the frame, a clip pivotally secured to one of the arms and engaging an adjacent arm for interconnecting the said arms while allowing relative movement therebetween, the latter of the said arms being adapted to releasably interlock with the said clip for holding the arms in expanded position while enabling the said arms to be readily folded or collapsed when desired, a stop member for limiting the movement of the wheeled mounting toward the frame, and retaining means for holding the mounting in collapsed position.

DUDLEY L. LEA.